United States Patent
Mayer

(10) Patent No.: US 7,506,086 B2
(45) Date of Patent: Mar. 17, 2009

(54) ELECTRONIC NETWORK WITH IDENTIFICATION CODE GENERATION AND ASSIGNMENT

(75) Inventor: Albrecht Mayer, Deisenhofen (DE)

(73) Assignee: Infineon Technologies AG, Munich (DE)

(*) Notice: Subject to any disclaimer, the term of this patent is extended or adjusted under 35 U.S.C. 154(b) by 149 days.

(21) Appl. No.: 11/552,775

(22) Filed: Oct. 25, 2006

(65) Prior Publication Data

US 2008/0104292 A1    May 1, 2008

(51) Int. Cl.
*G06F 13/00* (2006.01)
(52) U.S. Cl. .................. 710/104; 710/8; 710/9
(58) Field of Classification Search ............ 710/8, 710/9, 104
See application file for complete search history.

(56) References Cited

U.S. PATENT DOCUMENTS

| | | | | |
|---|---|---|---|---|
| 4,964,038 A * | 10/1990 | Louis et al. ............... 710/9 |
| 5,175,822 A * | 12/1992 | Dixon et al. .............. 710/9 |
| 5,636,342 A * | 6/1997 | Jeffries ................. 714/48 |
| 5,708,831 A * | 1/1998 | Schon .................. 709/245 |
| 5,892,929 A * | 4/1999 | Welker ................. 710/107 |
| 6,009,479 A * | 12/1999 | Jeffries .................. 710/8 |
| 6,216,172 B1 * | 4/2001 | Kolblin et al. ........... 709/253 |
| 6,629,172 B1 * | 9/2003 | Andersson et al. ........ 710/104 |
| 6,745,270 B1 * | 6/2004 | Barenys et al. .......... 710/104 |
| 7,139,839 B2 * | 11/2006 | White et al. ............ 709/245 |
| 2002/0105916 A1 * | 8/2002 | Smith .................. 370/257 |
| 2007/0294443 A1 * | 12/2007 | Berenbaum et al. ...... 710/104 |

* cited by examiner

*Primary Examiner*—Glenn A Auve
(74) *Attorney, Agent, or Firm*—Dicke, Billig & Czaja PLLC

(57) ABSTRACT

An electronic network is disclosed. One embodiment includes a plurality of network devices, a bus for transferring data between the network devices and a bus master for controlling the transfer of data between the network devices. Each network device is identified using one unique identification code. At least one number generator is provided, which is adapted to generate a number upon a request from the bus master. The received number is used as identification code of the respective network device.

17 Claims, 3 Drawing Sheets

ELECTRONIC NETWORK WITH IDENTIFICATION CODE GENERATION AND ASSIGNMENT

BACKGROUND

An electrical network in the sense of the present application having any interconnection of electrical components such as computer components inside a computer or computers themselves. The devices connected to the network are being generally called network devices. The data transfer between the network devices may be accomplished using both wired and wireless interconnections. In particular, a bus may be used for transferring data between the network devices. Unlike a point to point connection, a bus can logically connect several network devices over the same wires. Each bus defines the sockets for physically connecting network devices such as computer hardware.

A bus network is a simple way to connect multiple network devices. However, problems may occur if more than one network device wants to transfer data cross the network at the same time. In order to rule out conflicts between network devices connected to the same bus network, a bus master is implemented. The bus master controls the transfer of data between the network devices. Whenever a particular network device intends to transfer data across the bus to another network device, it must request permission from the bus master. The bus master returns the admission and the time slots for transferring the respective data.

An identification code must be assigned to each network device connected to the network. This code is needed to indicate the destination and origin of a particular data packet transferred across the network. The identification code must be a unique numerical character. During the system start up phase of the electronic network, the network devices communicate the unique identification code to the bus master. This unique identification code is conventionally stored in an internal or external flash memory of the network device. The identification code is associated with the respective network device during its production. This has several disadvantages. First of all, an additional read only memory must be attached to each network device. Additional chips must be implemented for copying the identification code from the flash memory to the input/output of the network device. Since the network devices are produced and used by many different enterprises, the number of possible network devices and consequently the associated identification codes must have a great size. Many different enterprises must cooperate in order to avoid that the same network identification code is signed to different network devices. The management of these identification codes is expensive and cumbersome.

For these or other reasons, there is a need for the present invention.

SUMMARY

One embodiment provides an electronic network having a plurality of network devices, a bus for transferring data between the network devices and a bus master for controlling the transfer of data between the network devices. Each network device is identified using one identification code. However, contrary to conventional systems, the identification code is not assigned to the respective network devices during production. Instead a number generator is provided. The number generator is adapted to generate a number corresponding to the identification code of a network device. Consequently, the identification code according to the above embodiment is dynamically assigned to the respective network device.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
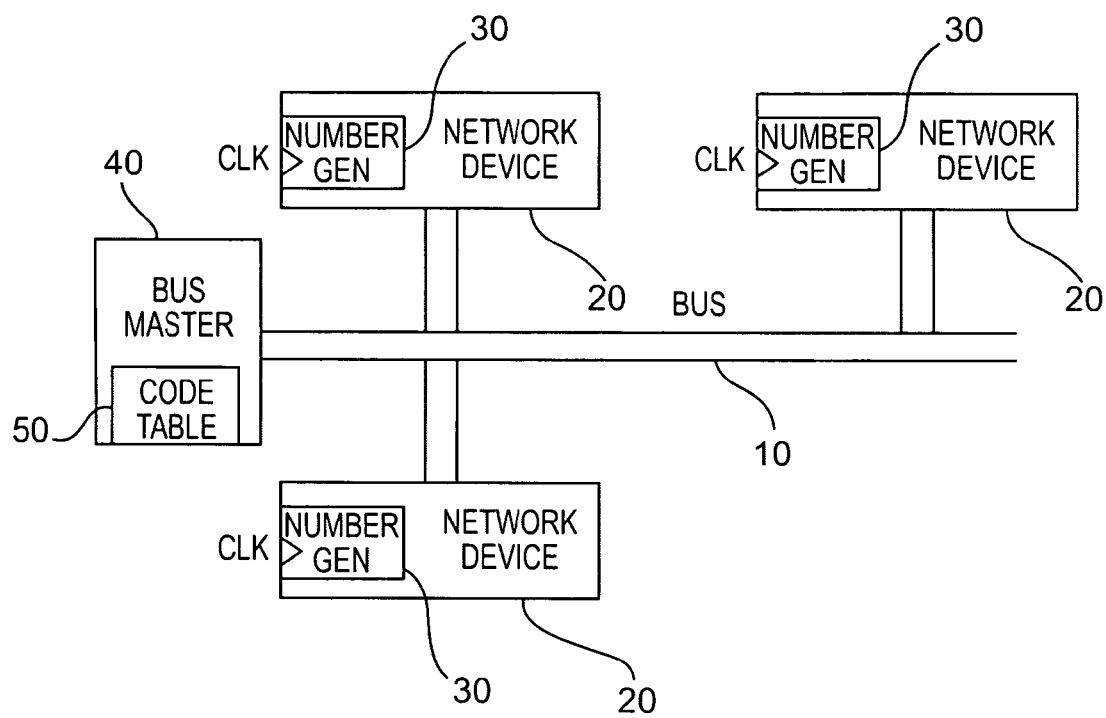
FIG. 1 illustrates an electronic network according one embodiment of the present invention.

The electronic network according to one embodiment of the present invention is illustrated in FIG. 1. The network includes a bus 10, which is connected to a plurality of network devices 20. Furthermore, a bus master 14 is connected to the same bus 10. The bus master 40 is used to control the flow information between network devices connected to the bus 10. Therefore, any network devices 20 must register with the bus master in order to communicate over the bus 10. The bus master 40 includes an identification code table 50 for storing the identification code of each network device. Each network device 20 includes a number generator 30 for generating its unique identification code.

Figure 2:
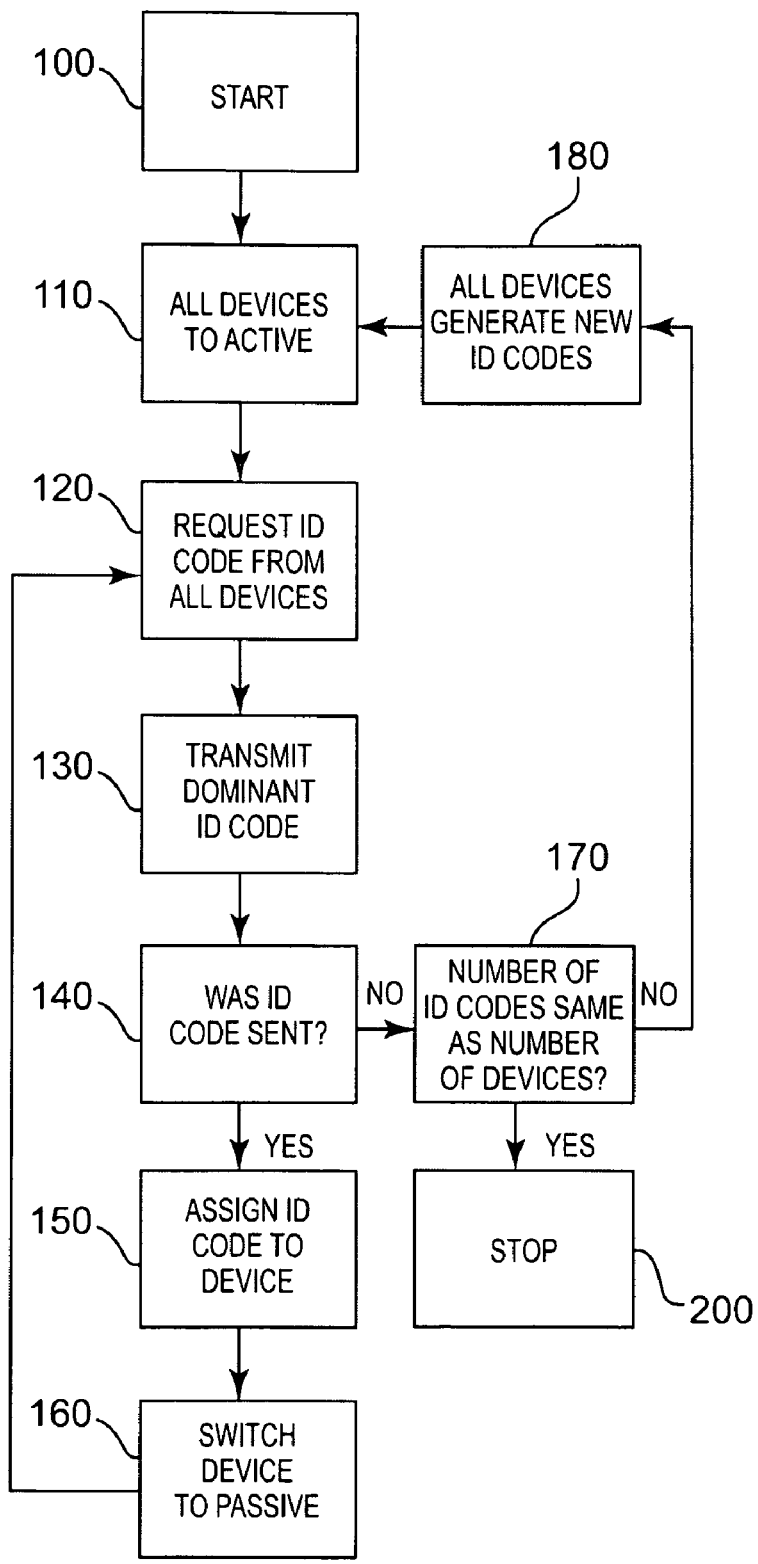
FIG. 2 illustrates a flow chart, which illustrates the assigning identification codes to all network devices connected to the bus.

The procedure of assigning identification codes to all network devices connected to the bus is depicted in FIG. 2. In Process 100, the procedure is started and in process 200 the procedure terminates. Initially, the bus master switches all devices into an active mode in process 110. Requests 110 is sent to all the devices connected to the bus, since in this situation the bus master does not have the means for addressing particular devices (identification codes). An active device is adapted to respond to a general requests from the bus master, whereas a passive device does not respond. In process 120 the bus master requests an identification code from all active devices. Each active device has a number generator for generating the identification code. The identification code has been generated by the number generator at any suitable point in time prior to the request from the bus master.

Figure 3:
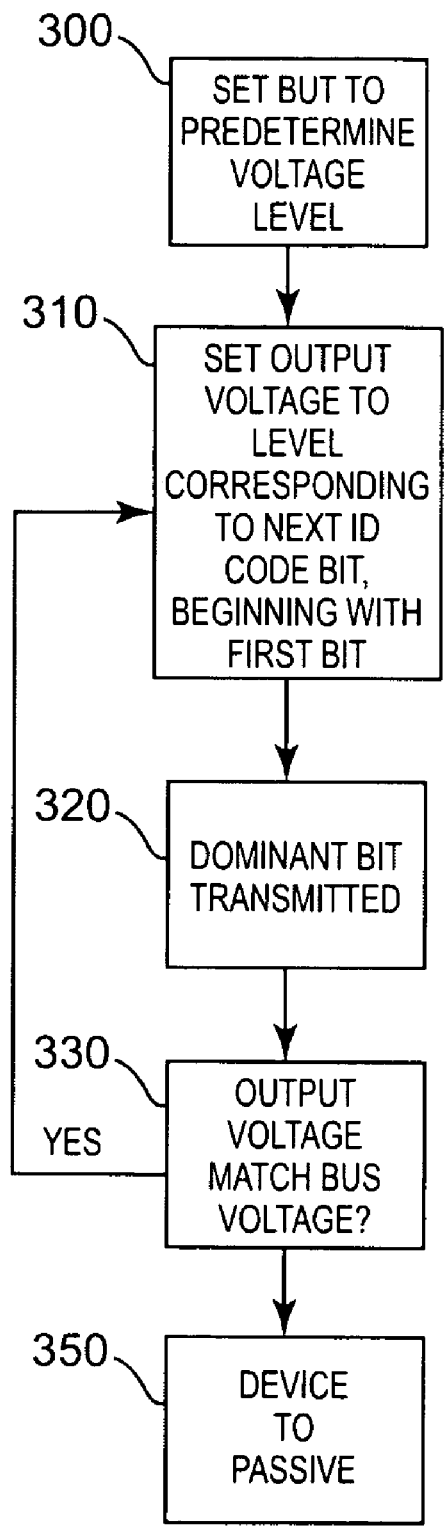
FIG. 3 illustrates the process of deciding, which identification codes is transmitted in response to the request 120 from the bus master in FIG. 2.

In process 130 the dominant identification code is transmitted to the bus master. The procedure for choosing the dominant identification code is illustrated in FIG. 3. One of the identification codes labelled dominant identification code is transmitted depending on the bit sequence of each of the codes.

In process 140, the bus master checks, whether an identification codes has been transmitted in response to the request of process 120. If this is answered in the affirmative, then the bus master assigns the received ID to the active device corresponding to the dominant identification code in process 150. Thereafter, the dominant active device is switched into a passive mode and the procedure recommences with requesting the identification code from all active devices. Therefore, the identification code is not requested once more from the dominant active device in process 120. Another identification codes different from the previously transmitted ID turns out to be dominant in process 130.

Processes 120 to 160 are repeated until all of the identification codes have been transmitted to the bus master. Finally, all of the active devices are switched into passive mode, such that the bus master does not receive any identification code upon request in process 140. Then the procedure goes to process 170 in FIG. 2.

In process 170, the bus master compares the number of received identification codes with the number of devices connected to the bus. If each network device has a unique identification code, then the number of transmitted identification codes corresponds to the number of devices connected to the bus. In this case, the procedure terminates in process 200.

However, the number of received identification codes may be smaller than the number of devices. This is the case, if by chance two different devices have the same identification code; this code is transmitted to the bus master in process 130 only once. Therefore, the comparison between the number of identification codes and connected devices is indicative of the fact that each device has a unique identification code.

Should the number of identification codes be smaller than the number of the devices, then the procedure turns to process 180. Now the bus master requests all of the network devices to generate new identification codes and replace the existing identification codes with the new ones.

The bus master does now know, which identification code has been assigned to two different devices. Therefore, all of the devices are requested to generate new identification codes. Thereafter, all of the devices are switched back into the active mode and the procedure of retrieving the identification codes from the respective devices (processes 120 to 160) recommences. If the new identification codes are unique for each device, then the procedure finally stops in process 200.

Finally the bus master may assign a unique session code to each device after having assigned the identification codes (not illustrated in FIG. 2). The session code is shorter than the identification codes, i.e. the session codes consist of a smaller number of digits than the identification codes. Thereby, the particular devices may be addressed using smaller codes, which in turn reduces the traffic on the bus each time a device is addressed.

FIG. 3 illustrates the process of deciding, which identification codes is transmitted in response to the request 120 from the bus master. In process 300, the network bus is set to a predetermined voltage level, for example 5V. Ground voltage (0V) is encoded as a logical 0 and the predetermined voltage level corresponds to a logical 1. Information is transmitted to all devices connected to the bus by changing the voltage level of the bus. The bus is clocked. Therefore, only a single bit may be transmitted during one clock cycle.

In process 310 all of the running active devices strive to output the voltage level corresponding to a particular bit. Since each device is requested to transmit its identification code, the particular bit corresponds to a bit in the respective identification code. All Network devices synchronously send their unique IDs bit by bit.

The physical bus is in a mode, where one applied bit value (1 or 0) is dominant (e.g., wired OR). For example, the bit value 0 may be dominant. If a single device outputs the dominant bit value 0, then the corresponding voltage is transmitted over the bus irrespective of the output of the remaining devices. Therefore, the dominant bit is transmitted in process 320. Each device decides whether its output voltage corresponds to the current bus voltage in process 330. If this is answered in the negative, then the corresponding device is stopped in process 350. The residual devices remain running active device; they output the next bit of their identification code during the next clock cycle in process 310.

As a consequence of the above procedure, the identification code commencing with the largest number of dominant bits (zeros), is transmitted. If two devices have the same dominant identification code, then this code is transmitted only once.

A network device according to an embodiment of the invention does not have a single identification code which is permanently stored in a read only memory. For example, the identification code may be generated at the moment in time, in which the bus master requests the code from the network device. Therefore, the identification code must not be unique with respect to all other network devices being produced and distributed among several enterprises. The identification code must only be unique with respect to the number of network devices connected to the particular network. Therefore, the number of digits used for assigning the identification code is much smaller than the corresponding number of the state of the art solution. There are no further requirements for managing the identification codes of the electronic network according to the present invention.

According to one embodiment of the present invention, the number generator includes an electronic counter adapted to receive a clock signal. An electronic counter is a type of memory, which increments a stored number each time a particular event or process has occurred. Once the highest possible number, which may be stored, is reached, the counter is reset to zero and recommences counting from there. Therefore, a particular number is assigned to each moment in time. If the maximum number to be stored in the counter is much larger than the number of network devices of the electronic network, then the chance of assigning the same identification code to different network devices is exceedingly small.

Each network device is associated with one of the number generators. The number generators associated with one network device are adapted to generate the identification code of the network device upon request from the bus master. Instead of providing an identification code memory for each network device, the present invention provides a number generator with each network device. The probability of generating any particular number among the numbers contained in the counter is uniformly distributed. If N signifies the number of binary digits for storing the count within each counter, then the probability for choosing one particular number among the numbers is equal to $1:2^N$. Let M be the number of devices connected to a particular network. Then the probability of generating the same identification code as one of the existing identification codes of the connected network devices is equal to $M:2^N$. If the counter contains a sixteen digit memory, then the probability would be equal to approximately $M \times 15 \times 10^{-4}$% percent. The chance of assigning the same identification code to different network devices would be exceedingly small for any small or medium sized network. The chance may be made arbitrarily small by increasing the number of digits contained in the counter. Instead of using a counter, a random number generator or pseudo random number generator may be used for generating the identification code upon request from the bus master. Any known random number generator or pseudo random number generator may be used, which generates numbers having a limited number of digits.

According to one embodiment the bus master is adapted to identify all connected network devices automatically. All network devices are connected to the same physical bus. There is no individual device select signal. The bus master requests an identification code from all devices connected to the bus as a start of an Identification Session. All Network devices synchronously generate and send their identification codes bit by bit. The devices send their identification codes simultaneously and synchronously. However, only one identification code is transmitted to the bus master sequentially. This is due to the following procedure:

The bus is arranged in such a way that a predetermined voltage, in particular 5 V, is initially impressed upon the data line of the bus. A resistor having a predetermined resistance, for example 1 kΩ, is connected to the data line. The physical bus is in a mode, where one applied bit value (1 or 0) is dominant. For example all of the devices may comprise an open-collector output. Therefore, they may only reduce the voltage applied to the bus to ground voltage. If any one of the devices connected to the bus intends to reduce the bus voltage, then the voltage is in fact reduced to ground potential. In this case ground potential (corresponding to 0) is dominant. Each device compares the actual bus voltage with the voltage the device intends to transmit across the bus. If the bus voltage is different from the intended output voltage, then the device stops transmitting the bit sequence constituting the identification code.

Due to the above procedure, the identification code starting with the largest number of "0"s corresponding to ground voltage is initially transmitted across the bus. Apparently, the initial voltage may be arbitrarily chosen and the connected devices may be adapted to increase instead of reduce the bus voltage. If the first identification code has been transmitted to the bus master, then all of the devices except for the device corresponding to the transmitted identification code simultaneously recommence the transmission of their identification codes to the bus master. This process is continued until all of the identification codes have been transmitted to the bus master.

Usually a short session ID may be assigned to each device, which is used for the following payload requests instead of the long unique ID.

In the event, that the number generator generates a number which has already been assigned as identification code to a particular network device, the master bus may request a novel identification code from the particular number generator. Therefore, conflicting identification codes may be prevented. To this end, the electronic network according to the invention may comprise a bus master, which has an identification code table. The identification code table contains all of the identification codes which have been assigned to network devices connected to the bus.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An electronic network, comprising:
    a plurality of network devices;
    a bus for transferring data between the network devices;
    at least one number generator which generates identification codes;
    a bus master for assigning one of the generated identification to each of the network devices such that each network device has a unique identification code, for controlling the transfer of data between the network devices using the identification codes, and for assigning a unique session code to each network device after having assigned the identification code, said session code being shorter than the identification code.

2. The electronic network according to claim 1, wherein the at least one number generator generates the identification code upon request from the bus master.

3. The electronic network according to claim 1, comprising the bus master is adapted to provide a previously generated number.

4. The electronic network according to claim 1, wherein the at least one number generator comprises an electronic counter adapted to count a clock signal.

5. The electronic network according to claim 4, comprising each network device is associated with one of the number generators, the number generator of one network device being adapted to generate upon request the identification code of the one network device.

6. The electronic network according to claim 5, comprising the number generator of one particular network device is adapted to output a count value maintained in the counter of the number generator, when the request from the bus master is received, the output count value corresponding to the identification code of the particular network device.

7. The electronic network according to claim 1, comprising wherein the number generator is a random number generator or a pseudo random number generator.

8. The electronic network according to claim 1, wherein the bus master requests novel identification codes if two different number generators generate the same identification code.

9. The electronic network according to claim 8, wherein the bus master compares the number of unique identification codes returned upon the request with the number of network devices which returned an identification code and request novel identification codes if the number of unique identification codes returned is smaller than the number of devices which returned an identification code.

10. The electronic network device according to claim 8, wherein the bus master comprises an identification code table, in which the identification code of each network device connected to the network is stored.

11. A method for assigning identification codes to a network device in an electronic network, comprising:
    a bus master reguesting an identification code from all of the network devices connected to a bus;
    each network device generating an identification code using number generators associated with the respective network devices;

transmitting the identification codes to the bus master; and
the bus master assigning each received identification code to the respective device, and assigning a unique session code to each device after having assigned the identification codes, the session codes being shorter than the identification codes.

12. The method according to claim 11, comprising wherein the bus master verifies whether the number of unique identification codes received from the network devices matches the number of network devices which transmitted identification codes to the bus master,
the bus master requesting new identification codes from all of the network devices connected to the bus if the number of unique identification codes does not match the number of network devices which transmitted identification code to the bus master.

13. An electronic network, comprising:
a plurality of network devices, each network device having a code generator;
a bus for transferring data between the network devices;
a bus master for controlling the transfer of data between the network devices via the bus, wherein
upon request of the bus master, each network device transmits an identification code generated by the corresponding code generator to the bus master via the bus, the bus master assigns each identification code to the corresponding network device, and assigns a unique session code to each network device after having assigned the identification code, the session codes being shorter than the identification codes.

14. The electronic network according to claim 13, wherein the bus master provides a previously generated number.

15. The electronic network according to claim 13, wherein the number generators comprise an electronic counters which count a clock signal.

16. The electronic network according to claim 13, wherein the number generator of each network device outputs a count value maintained in a counter of the number generator, when the request from the bus master is received, the output count value corresponding to the identification code of the network device.

17. An electronic network, comprising:
a plurality of network devices, each network device including generating means for generating identification codes;
transferring means for transferring data between the network devices;
control means for controlling data transfer between the network devices via the transferring means, wherein
upon request from the control means, each network device transmits an identification from the generating means to the control means, the control means assigning each identification code to the network device from which the identification code was received and assigning a unique session code to each network device after having assigned the identification code, the session codes being shorter than the identification codes.

* * * * *